US012606153B2

(12) United States Patent
NakaMats

(10) Patent No.: US 12,606,153 B2
(45) Date of Patent: Apr. 21, 2026

(54) INTERMITTENT ENERGY/INERTIA MOBILE UNIT AND MOVEMENT METHOD

(71) Applicant: Dr. NakaMats Innovation Institute, Tokyo (JP)

(72) Inventor: Yoshiro NakaMats, Tokyo (JP)

(73) Assignee: DR. NAKAMATS INNOVATION INSTITUTE, Tokyo (JP)

( * ) Notice: Subject to any disclaimer, the term of this patent is extended or adjusted under 35 U.S.C. 154(b) by 449 days.

(21) Appl. No.: 17/794,017

(22) PCT Filed: Jan. 20, 2020

(86) PCT No.: PCT/JP2020/001758
§ 371 (c)(1),
(2) Date: Jan. 9, 2023

(87) PCT Pub. No.: WO2021/149114
PCT Pub. Date: Jul. 29, 2021

(65) Prior Publication Data
US 2023/0150476 A1 May 18, 2023

(51) Int. Cl.
*B60W 20/15* (2016.01)
*B60W 10/08* (2006.01)
*B60W 20/40* (2016.01)

(52) U.S. Cl.
CPC ............ *B60W 20/15* (2016.01); *B60W 10/08* (2013.01); *B60W 20/40* (2013.01); *B60W 2710/08* (2013.01)

(58) Field of Classification Search
CPC ...... B60W 20/15; B60W 10/08; B60W 20/40; B60W 2710/08; G05D 1/0061; G05D 1/0088; G05D 1/021; G05D 1/0214; G05D 1/0221; G05D 1/0223

USPC ...................................................... 701/22, 54
See application file for complete search history.

(56) References Cited

U.S. PATENT DOCUMENTS

| | | | | |
|---|---|---|---|---|
| 6,793,029 | B2 * | 9/2004 | Ching ..................... | B60K 6/12 |
| | | | | 180/165 |
| 8,504,259 | B2 * | 8/2013 | Heap .................... | B60W 10/115 |
| | | | | 701/87 |
| 10,583,836 | B2 * | 3/2020 | Takada ............ | B60W 30/18072 |
| 2002/0152015 | A1 * | 10/2002 | Seto ..................... | B60K 31/042 |
| | | | | 123/352 |
| 2005/0230161 | A1 * | 10/2005 | Terui ..................... | B63H 21/21 |
| | | | | 180/65.265 |

(Continued)

FOREIGN PATENT DOCUMENTS

| | | |
|---|---|---|
| JP | 56-22113 | 3/1981 |
| JP | 62-61833 | 3/1987 |

(Continued)

OTHER PUBLICATIONS

International Search Report dated Mar. 25, 2020 in International (PCT) Application No. PCT/JP2020/001758.

*Primary Examiner* — Manglesh M Patel
(74) *Attorney, Agent, or Firm* — Wenderoth, Lind & Ponack, L.L.P.

(57) ABSTRACT

[Solution]
A vehicle, ship, construction machinery, robot, etc., can conserve fuel and extend its travel distance by repeatedly cutting off energy (gasoline, batteries, etc.) to generate "inertia force," running by this "inertia force," adding energy again before the running speed reaches zero, and then cutting off energy again.

4 Claims, 3 Drawing Sheets

(56) References Cited

U.S. PATENT DOCUMENTS

| | | | | |
|---|---|---|---|---|
| 2012/0303237 A1* | 11/2012 | Kumar | ................ | B61L 15/0058 |
| | | | | 701/99 |
| 2014/0067225 A1* | 3/2014 | Lee | .................... | B60W 30/188 |
| | | | | 701/93 |
| 2014/0156171 A1* | 6/2014 | Kono | ....................... | F16D 48/06 |
| | | | | 701/110 |
| 2015/0066261 A1* | 3/2015 | Cusumano | ............. | B60L 58/20 |
| | | | | 180/65.265 |
| 2015/0286199 A1* | 10/2015 | Fushiki | .................... | B60L 3/12 |
| | | | | 700/295 |
| 2015/0291171 A1* | 10/2015 | Kuroki | ........... | B60W 30/18136 |
| | | | | 701/70 |
| 2016/0017825 A1* | 1/2016 | Maeda | ................. | B60W 10/06 |
| | | | | 701/58 |
| 2016/0121898 A1* | 5/2016 | Jo | ................... | B60W 30/18072 |
| | | | | 180/65.21 |
| 2016/0137184 A1* | 5/2016 | Hokoi | .............. | B60W 50/0097 |
| | | | | 180/65.265 |
| 2016/0167676 A1* | 6/2016 | Eo | ....................... | B60W 50/082 |
| | | | | 701/99 |
| 2016/0221580 A1* | 8/2016 | Yamanaka | ...... | B60W 30/18072 |

| | | | | |
|---|---|---|---|---|
| 2016/0257323 A1* | 9/2016 | Meyer | .................... | B61L 27/12 |
| 2017/0021831 A1* | 1/2017 | De Smet | .............. | B60K 31/00 |
| 2017/0113679 A1* | 4/2017 | Hata | ..................... | B60W 10/02 |
| 2017/0174218 A1* | 6/2017 | Hansen | .......... | B60W 30/18072 |
| 2018/0022336 A1* | 1/2018 | Morimoto | ............ | F02D 41/021 |
| | | | | 180/65.21 |
| 2018/0111618 A1* | 4/2018 | Morimoto | ............ | B60W 10/26 |
| 2019/0135264 A1* | 5/2019 | Shin | ..................... | B60W 20/40 |
| 2019/0204828 A1* | 7/2019 | Ishikawa | ............. | G05D 1/0223 |
| 2019/0217844 A1* | 7/2019 | Pursifull | .............. | B60W 10/06 |
| 2019/0257415 A1* | 8/2019 | Kook | ................. | F16H 61/0213 |
| 2019/0337397 A1* | 11/2019 | Park | ........................ | B60L 50/51 |
| 2020/0023844 A1* | 1/2020 | Takahashi | .......... | B60W 30/143 |
| 2020/0257304 A1* | 8/2020 | Moshchuk | ........ | B60W 60/0016 |
| 2020/0278217 A1* | 9/2020 | Ahmad | .................. | G01C 21/16 |
| 2024/0190472 A1* | 6/2024 | Futagami | ......... | B60W 60/0018 |

FOREIGN PATENT DOCUMENTS

| | | |
|---|---|---|
| JP | 63-121528 | 5/1988 |
| JP | 2004-44800 | 2/2004 |
| JP | 2006-322322 | 11/2006 |
| JP | 2007-187090 | 7/2007 |
| JP | 2018-145903 | 9/2018 |

* cited by examiner

[Fig.1]
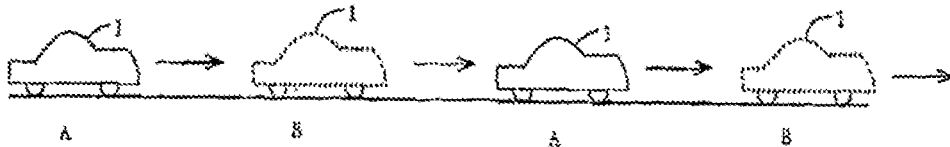
[Fig.2]
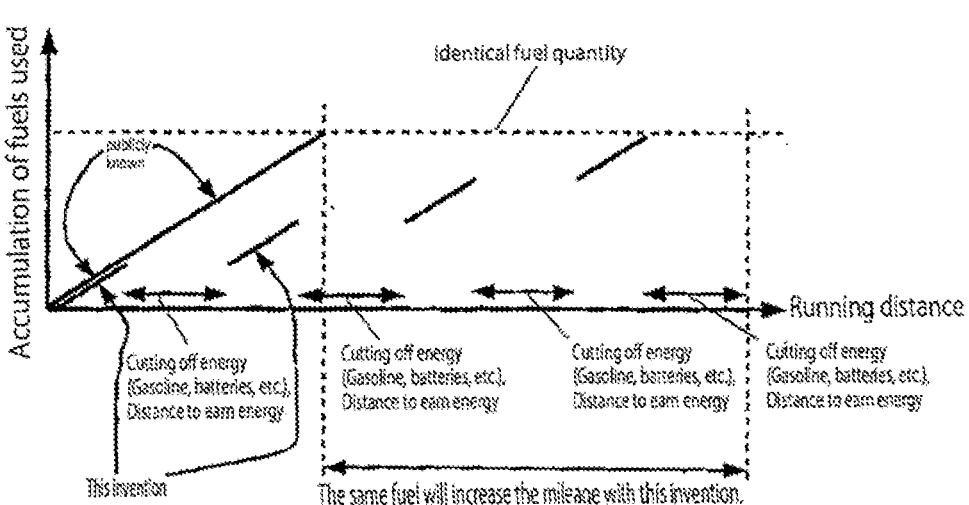
[Fig.3]
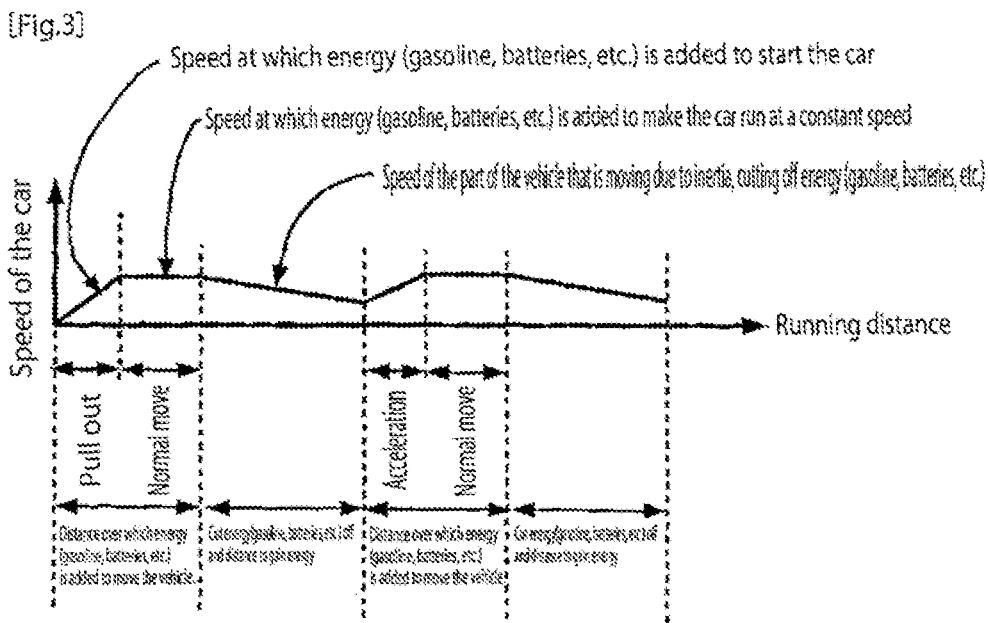

[Fig.4]
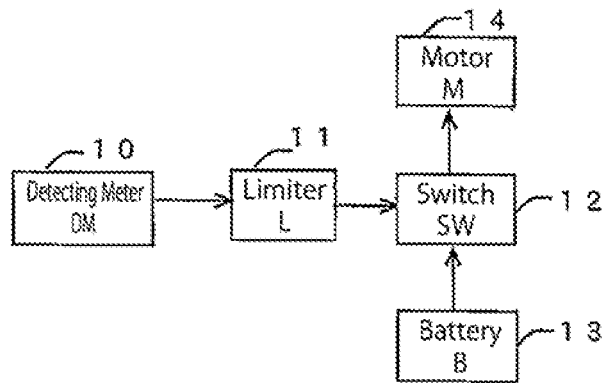
[Fig.5]
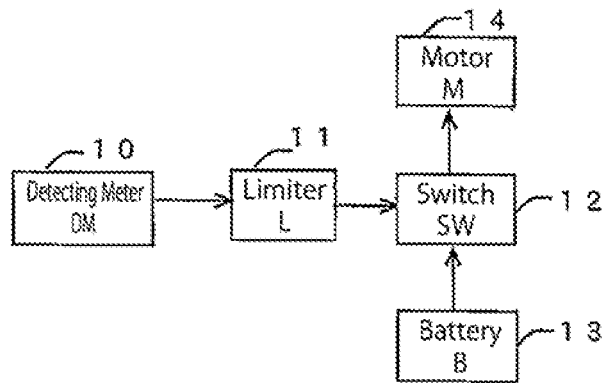
[Fig.6]
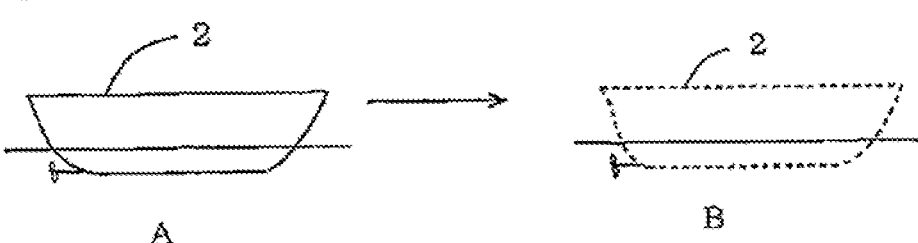
A        B

INTERMITTENT ENERGY/INERTIA MOBILE UNIT AND MOVEMENT METHOD

TECHNICAL FIELD

The invention relates to mobile energy savings in moving objects such as cars, construction equipment, tanks (military vehicle), trains, robots, ships, and aircraft.

BACKGROUND ART

Due to environmental and resource issues, the automobile industry is currently competing with each other to extend the driving distance with less energy. These include diesel engine technology using diesel oil as fuel, so-called hybrid technology, fuel cells, electric vehicles, and E-power, in which the battery is charged by the gasoline engine, in order to increase the mileage per liter of gasoline.

CITATION LIST

Patent Literature

[Patent Literature 1] JP2015-142311A

SUMMARY OF INVENTION

Technical Problem

This is a revolutionary invention that provides a solution to an important environmental problem caused by mankind, a solution to move a moving object with less energy. Hybrid technology is expensive and draining in terms of battery costs. Diesel engines and diesel hybrids are also reaching the limits of their efficiency with known methods. In addition, electric vehicles using lithium batteries are expensive.

The present invention was made in view of these points, and the problem to be solved is to provide a moving object capable of improving energy efficiency and a method for improving the moving energy efficiency.

Solution to Problem

The solution to the aforementioned problem is to utilize "inertia," which has not been paid attention to until now.

In other words, it is a moving object characterized by extending the travel distance and improving fuel efficiency by repeatedly cutting off the energy of the moving object and making it move by "inertial force" during the intermittent periods. The method is characterized in that energy is cut off while inertia is working on the moving object and energy is added when inertia is lost.

Advantage Effects of Invention

The inertia-driven movement of the new vehicle can improve fuel efficiency without changing conventional gasoline-powered, diesel-powered, hybrid, fuel-cell, or electric vehicles. Heavy moving objects such as tanks and construction machinery, as well as multiple drive units with strong driving power, can also travel longer distances with less fuel, and with better fuel efficiency than conventional vehicles. Energy and fuel consumption can be further improved by using set values related to travel distance or travel time. The system can also be used for ships, aircraft, trains, construction machinery, tanks, and armored vehicles.

FIG. 1 Drawing of the invention

FIG. 2 A drawing of how the same fuel (gasoline, batteries, etc.) can be used to increase the driving distance with this invention.

FIG. 3 A curve showing changes in the speed at which a car moves using the invention, showing the speed at which the car is moving when fuel (gasoline, batteries, etc.) is added and the speed at which it is moving due to inertia, and explaining how the fuel (gasoline, batteries, etc.) can be reduced.

FIG. 4 A drawing of how the invention can save fuel (gasoline, batteries, etc.) at the same driving distance.

FIG. 5 An example of a block diagram of the mobile structure of the invention.

FIG. 6 Drawing of the case where the invention is used on a ship.

FIG. 7 Drawing of the case where the invention is used on an aircraft.

DESCRIPTION OF EMBODIMENTS

When an object is subjected to some force, it moves. The force exerted by the object when it is subjected to the force is called "inertia force". The greater the mass, the greater the "inertia force". When an object is moving (when its speed is greater than 0) and the force (i.e., the driving force of the engine, etc. in a car) is set to 0, the inertia of the object (e.g., the person riding on the car) works in the direction of movement, and the object moves on the road, even though no force is applied, as seen from the outside world (i.e., the road, etc.) This inertial force is called "inertia". The present invention takes advantage of the fact that this inertial force is always present when energy is cut off.

The present invention effectively utilizes this "inertial force" of a moving object that has been moved by an engine, an idea that was completely new in the past, to enable energy savings and travel distance extension for all moving objects, which can be used for any moving object.

That is, the idea of utilizing the "inertial force" of a moving object to save energy and increase distance when the speed of the moving object is greater than zero had never been thought of before.

FIG. 1 illustrates the application of the present invention to a car. a shows a car 1 running normally with gasoline turning the engine and adding energy. b shows a car moving by "inertial force" after shutting off the aforementioned energy. c shows a car 2 running normally with gasoline turning the engine and adding energy. d shows a car 3 running normally with gasoline turning the engine and adding energy. The energy in this invention is, for example, gasoline for a normal car, diesel fuel for a diesel car, battery and gasoline for a hybrid car, and battery for an electric car. To move around in a car, energy is used as fuel for the driving force of the engine or motor that is applied to the drive wheels. To shut off (cut off, disconnect, or cut off) energy means to turn off the supply of energy from the engine or motor to the drive wheels, for example, by means of a switch, valve, connector, coupling, or the like. Similarly, to connect (add or link) energy is to turn on the supply of energy, engine, or motor to the driving wheel section by means of a switch, valve, connector, coupling, or the like.

The present invention is to cut off energy while the "inertia force" is working on the moving object, and to add energy when the "inertia force" is lost. While the "inertia force" is working means the product of the speed and the weight (mass) of the moving object is more than 0 even if the energy is turned off. This invention is an invention of a moving body that cuts off energy when the speed of the moving body reaches a predetermined value and adds energy again when the inertia force reaches a predetermined lower limit. The above is the first example of this invention.

In order to make effective use of inertia, the invention is suitable for using multiple driving power devices (motors or engines). The increase in the number of driving force devices increases the overall weight of the mobile body, but also increases the driving force and "inertia force". Simply making the body n times heavier will increase the inertia force by a factor of n, but the driving force per unit weight will be smaller and energy will be consumed more, resulting in lower fuel efficiency and shorter distance traveled using inertia. In the second example of this invention, the driving force device is n times the weight, and multiple driving force devices, i.e., n motors or engines, are arranged so that both driving force and inertia force are n times the weight. Specifically, the "inertia force" increases with the weight (mass of the moving object), as mentioned above, which is effective in reducing energy. In addition, the driving force, i.e., the number of motors or engines, also increases. These two effects offset the negative effects of the need for a larger driving force and energy due to the increased weight, and also reduce energy consumption, resulting in a positive overall fuel consumption effect.

Multiple driving force devices are defined as n=2 or more.

By making one drive unit smaller and lighter and installing n units, both driving force and inertia can be increased.

In the third example of this invention, energy is disconnected and connected when the distance reaches a predetermined value.

This means that "inertial force" is used when the speed is above 0, instead of only when the accelerator is turned off (i.e., the driving force is set to 0) as in the past. Specifically, the present invention uses "inertia force" when starting, at a constant speed in normal movement (when the acceleration is 0), during acceleration (when the speed increases by a constant amount and the acceleration is a constant value), and when the acceleration tends to increase or decrease (sudden start or sudden deceleration).

When the distance traveled from the point where energy is added reaches a predetermined value, it is disconnected from the energy. It is then connected to the energy when, for example, the speed reaches a predetermined value. This is repeated in the fourth example.

FIG. 2 illustrates how the same fuel (gasoline, batteries, etc.) can be used to reduce the driving distance. The horizontal axis indicates the distance traveled. The vertical axis shows the accumulation of fuel used, i.e., the accumulation of energy used. The intersection of the vertical and horizontal axes is 0 for the distance traveled, 0 for the accumulated fuel used, and 0 for the time at this point. In both the known moving object and the proposed moving object, at time 0, energy (gasoline, batteries, etc.) is added to generate driving force by the engine to rotate the tires. Since a fixed amount of energy is added, the speed of the moving object is a constant speed. For example, the accelerator pedal of a car is set at a fixed angle.

A known moving object uses a certain amount of fuel according to the distance it travels from time 0. The "known" is indicated by the solid line in FIG. 2. The accumulation of fuel used by the known moving object is indicated by the long, rising diagonal line in the tilt as shown in the figure.

In contrast, the mobile of the present invention has the same oblique but shorter line as the known mobile from time 0 until the predetermined travel distance or predetermined time has elapsed. The invention then cuts off energy after the predetermined distance traveled or predetermined time from time 0. Then "inertia force" is generated and it moves by inertia. The accumulation of fuel used by the inventive moving object does not increase while it is traveling by "inertia force" after cutting off energy. Then, after a predetermined time or distance has elapsed from the time or position at which the aforementioned energy is turned down, energy is added. The invention mobile body then moves by the driving force of the engine or motor. In FIG. 2, it is represented by a solid "invention" line, which has the same slope as the solid slope of the known mobile body, but its length is much shorter than the length of the diagonal line of the known mobile body. These short oblique lines move in the upper right direction, and are separated from each other and parallel to each other. This is how the moving object moves.

Comparing a known moving object and the moving object of the present invention with the same accumulated fuel used, for example, as shown in FIG. 1, there are multiple and repeated distances where energy (gasoline, batteries, etc.) is turned down and energy is earned, so the same fuel can be used to save energy by extending the distance traveled by the present invention.

In FIG. 3, the horizontal axis shows the distance traveled. The vertical axis shows the car's travel speed. At the intersection of the vertical and horizontal axes, the speed of the car is 0, the time is 0, and the moving object is stopped. The figure illustrates the fact that the invention can increase the traveling distance and shows the change in the speed of the car's movement.

In FIG. 3, at time 0, energy (gasoline, batteries, etc.) is added to start the car. When a certain amount of energy is supplied, there is a section in which the car's speed gradually increases (start), followed by a section in which the speed becomes constant (normal movement). In the start and normal travel, energy (gasoline, batteries, etc.) is added to the car to move it. Then, after a predetermined distance or time from time 0, the energy is cut off and the car moves by "inertial force. This is how energy is earned. When the energy (gasoline, batteries, etc.) is cut off and the car is moving by "inertial force", the speed gradually decreases, but before it reaches zero, energy can be added to keep the car moving. The driving force of the engine or motor then drives the vehicle. In the acceleration section, the supply of energy is started, and then the supply of energy is reduced to the speed of the normal moving section, and the vehicle moves normally.

In this way, the start, normal movement, and no-energy movement are repeated to move.

This saves energy and increases the travel distance.

FIG. 4 illustrates how the invention can save fuel (gasoline, batteries, etc.) at the same driving distance. The horizontal axis is the distance traveled. The vertical axis is the accumulation of fuel used, i.e., the accumulation of energy used. At the intersection of the vertical and horizontal axes, the distance traveled is 0 and the accumulated fuel used is 0. The figure shows a known moving object and an inventive moving object at the same time and compares them. At the point 0, energy (gasoline, batteries, etc.) is added to generate driving force by the engine, and the driving force is transmitted to the tires, and the moving body moves at a constant speed. Since a fixed amount of energy is added, the speed is a constant speed. For example, the accelerator pedal of a car is set at a fixed angle.

FIG. 4 explains the fuel saved by the invention, which is different from FIG. 2.

A known mobile vehicle uses a certain amount of fuel according to the distance traveled from point 0. In FIG. 4, it is represented by the solid "known" line. The accumulation of fuel used by the known moving object rises in a linear fashion as described in FIG. 4.

In contrast, the mobile vehicle of the present invention is represented in FIG. 4 by a solid, short, diagonal line, "the present invention". And the vertical line at the top of the right side shows that the accumulated fuel required to travel the same distance is much less than that of a known mobile vehicle because of the distance that the energy (gasoline, batteries, etc.) is earned by cutting off the energy multiple times.

Although the amount of energy supplied depends on the angle of the gas pedal when the energy is cut off, the invention also includes automatic repetitive operation of the accelerator pedal by the driver, i.e., by the driver's intention, or automatically by gas pedal, inertia, and then accelerator.

Of course, safety functions such as braking, etc., can be based on the driver's intention or automatic braking, etc., can be provided.

According to the present invention, the moving object moves even when energy is cut off, so the present invention makes it possible to operate a moving object with less energy. The applicant conducted an actual run from Tokyo to Osaka using an ordinary gasoline car, and the experiment confirmed that this energy efficiency was higher than that of using hybrid technology to operate the car.

If the invention is used for hybrid, electric, and fuel cell vehicles, these energy efficiencies can be further increased.

A fifth example of the invention is shown in FIG. 5. Here, the control of the energy of the invention may be done manually, but FIG. 5 shows the principle configuration of the invention device in which the control can be done automatically. In the figure, 10 is a detection meter (DM) that detects the time, distance, speed, and acceleration of a moving vehicle; 11 is a limiter (L) that cuts off energy at a limited number of values in the upper and lower ranges of time, distance, speed, acceleration, and vehicle weight; 12 is a switch (SW) that turns on and off battery energy 13 with the limiter 11 The switch 12 is a motor (M) or engine driven by the battery energy 13, and 14 is a drive wheel. The switch 12 operates to transfer the output of the battery energy 13 to the motor or engine 14. In other words, when the switch is on, the battery energy 13 is connected to the motor or engine 14 to turn the wheels, and when the switch is off, the battery energy 13 is disconnected from the motor or engine 14. The operation of the car configured in this way is described as follows.

When moving a moving object, the information from the speed detection meter releases limiter 11 and switch 12 is turned on. As a result, battery 13 causes motor or engine 14 to rotate at a predetermined speed. This motor or engine 14 turns the car's driving wheels. As the wheels rotate, the car 1 (see FIG. 1) speeds up to a predetermined speed, e.g., 60 km/hour. The limiter 11 monitors the output of the detection meter 10. In FIG. 3, for example, the limiter 11 senses that the speed has reached an upper limit value greater than 0. When the speed reaches the upper limit value, the limiter 11 acts on switch 12 to turn off its contacts and turn off the energy, thereby reducing the driving force of the motor or engine 14 to 0. If the clutch that turns the wheels is disengaged when the driving force is reduced to zero, the car will travel by "inertia force" due to the mass of the car, although the speed of the car will decrease progressively.

When the limiter 11 detects that the speed has reached a predetermined lower limit (greater than 0), the limiter 11 turns on the switch 12. As a result, energy is added and the motor or engine 14 drives the driving wheels of the car 1 to continue traveling. The invention also includes a case in which, in addition to speed, the travel time, travel distance, acceleration, or moving weight are detected as detection meters (DM) and coupled to the limiter 11, so that when the travel time, travel distance, or acceleration reaches a predetermined value, the limiter acts to connect or disconnect the energy. The calculated value of the product of the speed and the amount of weight moved may also be coupled to the limiter 11.

Hereafter, the vehicle runs while repeating the disconnecting and connecting actions of energy. According to the present invention, disconnecting energy utilizes the "inertial force" of the car 1 and does not need to use energy in the meantime, thus improving energy efficiency.

The auto cruise control function described according to one aspect of the present invention is, for example, a function that automatically maintains a constant speed or follows the car ahead without the driver having to operate the accelerator pedal in a car. It is a function that cruises along a predetermined travel route while automatically adjusting the speed and other factors. The present invention applies to this auto cruise control function a function that runs automatically while repeatedly disconnecting and connecting energy by utilizing "inertial force".

The invention is included in the present invention when applied not only to ordinary gasoline vehicles, but also to diesel vehicles, hybrid vehicles (HV), plug-in hybrid vehicles (PHV), electric vehicles (EV), and fuel cell vehicles.

In gasoline-powered vehicles, the energy is gasoline, which controls a switch in the gasoline supply and turns on and off the driving force of the engine.

In hybrid vehicles (HV) and plug-in hybrid vehicles (PHV), the energy is gasoline and battery, and the switch of gasoline and battery is controlled to turn on and off the driving power of the engine and motor. In other words, when the motor is driven, the battery's electric supply switch is controlled, when the engine is driven, the gasoline supply switch is controlled, and when both motor and engine drive are used, both the battery's electric supply and gasoline supply switch are controlled.

In an electric vehicle (EV), the energy is the battery, which controls the switch of the battery's electric supply and turns on/off the motor drive.

In a fuel cell vehicle, the energy is hydrogen, natural gas, or alcohol (referred to as hydrogen and other energy) and the battery for driving the motor, which controls the switch of the hydrogen and other energy and the battery's electricity supply to turn the motor's driving power on and off.

In the above, the invention also includes the case where the motor or engine is coupled to the drive wheels by coupling or uncoupling a clutch.

In the above explanation, the case in which the invention is applied to a car (automobile) was taken as an example, but the invention can be applied to any moving object, such as a ship, aircraft, construction machinery, or robot, in addition to the automobile described above in FIG. 1.

FIG. 6 is the sixth example of the invention and shows the case where the invention is applied to a ship, a shows a ship 2 running normally. b shows a ship moving continuously, although it uses energy intermittently by using "inertial force" after switching off the fuel during normal running shown in a. Others are the same as in FIG. 1.

FIG. 7 shows the seventh example of the invention as applied to an aircraft. a shows the state in which the aircraft

Figure 7:
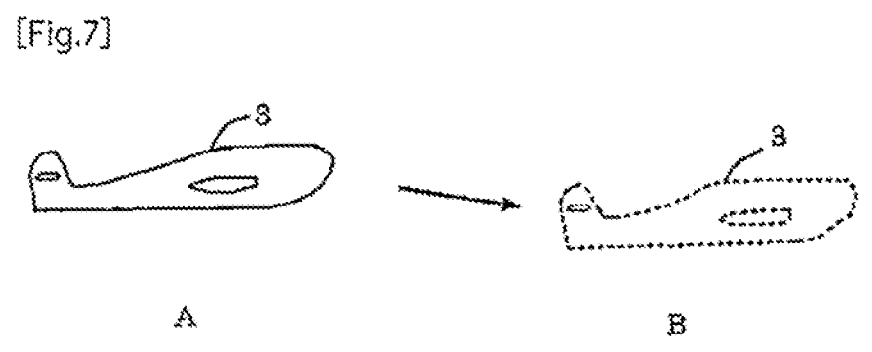

3 is in normal flight. b shows the state in which the aircraft 3 is in normal flight as shown in a. After cutting off the fuel during normal flight, the propeller-type aircraft idles the jet engine blades and flies using "inertial force" and then supplies fuel again and continues flight, repeating the process. The state of flying is shown. As indicated by the arrows, in the case of an aircraft, when the engine is turned off, there is no ground or water as in a car or ship, so the altitude drops slightly for a time, as shown in FIG. 7, but the aircraft is refueled and continues to fly up again, improving the fuel extremely.

This invention can be used not only for cars, but also for ships, aircraft, construction machinery, robots, tanks, armored vehicles, trains, and any other mobile equipment, as well as for operating and controlling methods, all of which are included in this invention.

INDUSTRIAL APPLICABILITY

As described above, this invention can be used for all kinds of moving objects and has great industrial potential.

REFERENCE SIGNS LIST

1 Car
2 Ship
3 Airplane
10 Detecting meters
11 Limiter
12 Switch
13 Battery
14 Power unit such as motor or engine
The invention claimed is:

1. A moving object including a car, a ship, or a machine configured with a control system to continually drive the moving object using two different drive modes, the moving object comprising:
  a detection meter configured to detect a travel distance of the moving object;
  a speed detector configured to detect a speed of the moving object; and
  a switch configured to switch between (i) a first driving mode for driving the moving object, the first driving mode being achieved using energy from a battery or fuel including hydrogen, and (ii) a second driving mode for driving the moving object, the second driving mode being achieved using inertia of the moving object only without using the battery or the fuel,
  wherein when (i) the first driving mode is driving the moving object and (ii) the travel distance of the moving object from a point where the first driving mode is initiated reaches a predetermined threshold, the switch switches from the first driving mode to the second driving mode, and
  wherein when (i) the second driving mode is driving the moving object and (ii) the speed of the moving object is detected as being equal to or less than a predetermined lower speed limit, the switch switches from the second driving mode to the first driving mode.

2. The moving object according to claim 1, wherein while traveling on a route of travel, the switch repeatedly switches between the first driving mode and the second driving mode.

3. A method of moving a moving object including a car, a ship, or a machine configured with a control system to continually drive the moving object using two different drive modes, the method comprising:
  detecting a travel distance of the moving object;
  detecting a speed of the moving object;
  switching between (i) a first driving mode for driving the moving object, the first driving mode being achieved using energy from a battery or fuel including hydrogen, and (ii) a second driving mode for driving the moving object, the second driving mode being achieved using inertia of the moving object only without using the battery or the fuel,
  wherein when (i) the first driving mode is driving the moving object and (ii) the travel distance of the moving object from a point where the first driving mode is initiated reaches a predetermined threshold, the switching switches from the first driving mode to the second driving mode, and
  wherein when (i) the second driving mode is driving the moving object and (ii) the speed of the moving object is detected as being equal to or less than a predetermined lower speed limit, the switching switches from the second driving mode to the first driving mode.

4. The method of moving according to claim 3, wherein while traveling on a route of travel, the switch repeatedly switches between the first driving mode and the second driving mode.

\* \* \* \* \*